No. 783,624. PATENTED FEB. 28, 1905.
J. T. DAVIS.
APPARATUS FOR MAKING ARTIFICIAL FUEL BY DISTILLATION.
APPLICATION FILED JULY 11, 1901.
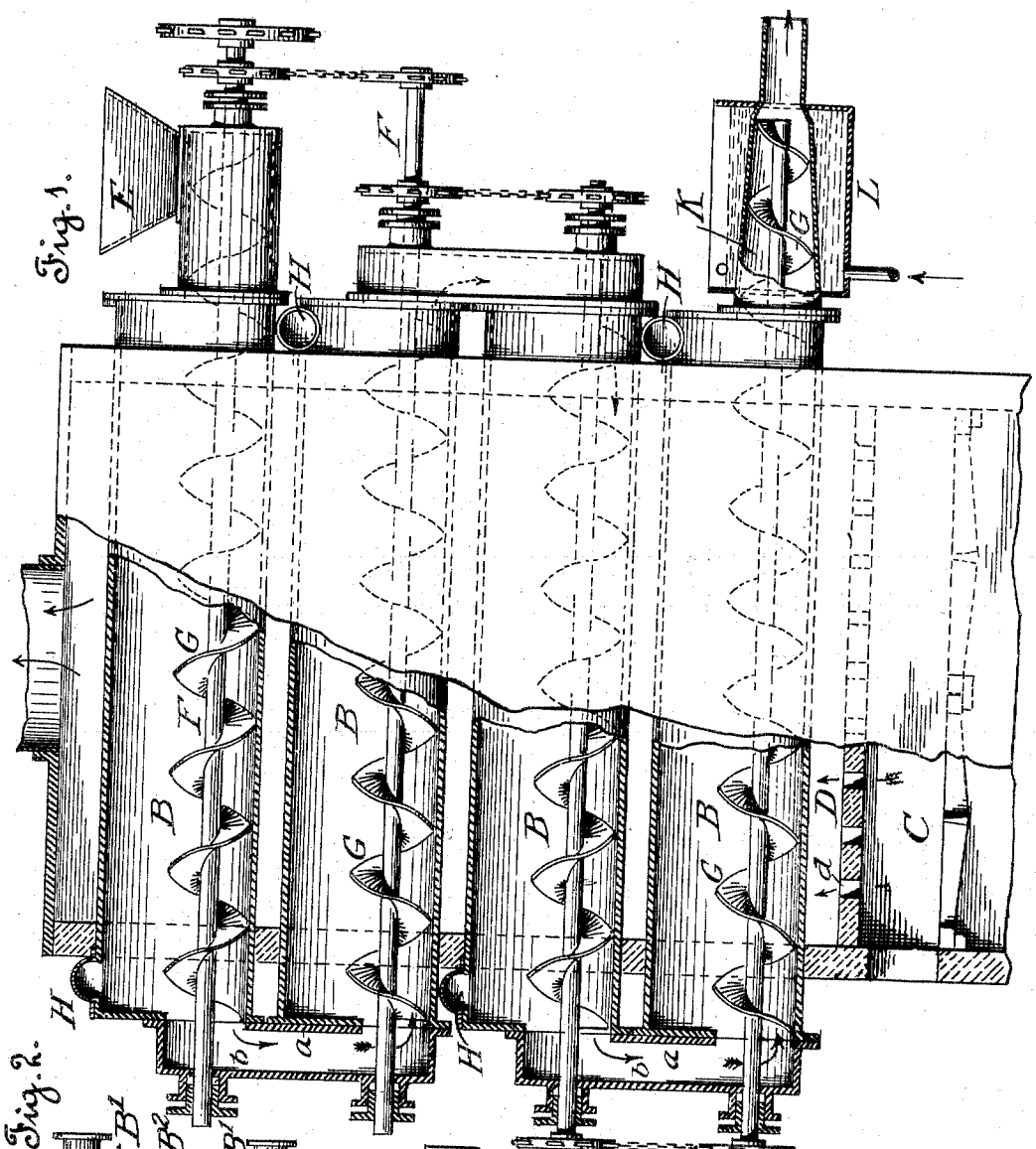
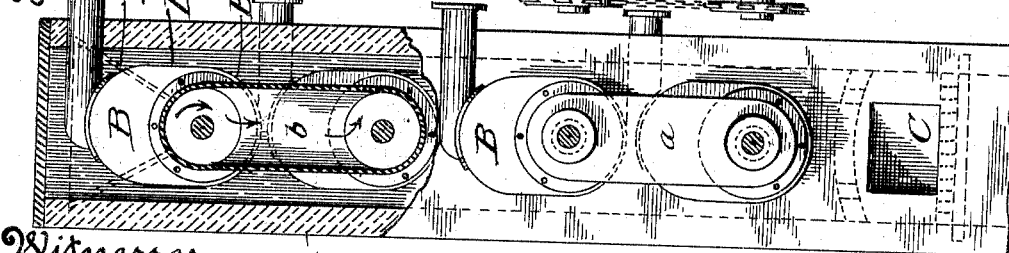

No. 783,624. Patented February 28, 1905.

UNITED STATES PATENT OFFICE.

JOHN T. DAVIS, OF SAN FRANCISCO, CALIFORNIA.

APPARATUS FOR MAKING ARTIFICIAL FUEL BY DISTILLATION.

SPECIFICATION forming part of Letters Patent No. 783,624, dated February 28, 1905.

Application filed July 11, 1901. Serial No. 67,917.

*To all whom it may concern:*

Be it known that I, JOHN T. DAVIS, a citizen of the United States, residing at San Francisco, in the county of San Francisco and State of California, have invented certain new and useful Improvements in Apparatus for Making Artificial Fuel by Distillation, of which the following is a specification.

My invention relates to the manufacture of artificial fuel, and more particularly to an apparatus for carrying out a process of producing artificial-fuel products described in an application for Letters Patent filed by me July 1, 1901, under the Serial No. 66,772. That process, generally speaking, comprises the mixing of a hydrocarbon with carbonaceous or carboniferous material and the subjecting of the mixture to heat, whereby partial distillation is effected, leaving as a residuum a combustible mixture of the hydrocarbon and carbonaceous material adapted to form a fuel or a part of a fuel.

The apparatus which is the subject of the present application is shown in the accompanying drawings, in which—

Figure 1 is a longitudinal section. Fig. 2 is an end elevation, partly broken away.

A represents a structure of brick or metal, adapted to inclose the apparatus, and which is preferably lined with fire-brick or other refractory material. Within this inclosure is a series of pipes B of oval, elliptical, or otherwise elongated cross-section vertically, arranged one beneath another and connected to form a continuous passage. The connections can be made by elbows from pipe to pipe or, as shown in the drawings, by hanging walls $a$, which in connection with the inclosing structure form passages $b$. I prefer to make these pipes or stills by connecting two approximately half-round sections B' by plates B², all securely riveted together.

In the lower part of the inclosure is a furnace C, separated from the series of pipes by a crown D, having openings $d$ to admit heat. Outside the inclosing wall is a feed-hopper E, in communication with the upper one of the connected pipes, which projects beyond the inclosing structure. Extending through each pipe of the series is a shaft F, upon which is mounted a conveyer-flight G, which fills the bottom of each pipe, but allows room above it for the escape of vapors, and all these shafts are geared together in any suitable way, as by the sprocket-gearing shown, so as to drive the flights in the proper direction to carry material through the whole series. Any number of pipes can be used, according to the desired capacity of the machine. Each pipe has an outlet H, which projects from its top at one end through the wall of the inclosing structure.

In operation carbonaceous material, preferably in a finely-divided state, is mixed with a hydrocarbon, such as crude petroleum, and is fed into the hopper, or, if preferred, these substances can be fed together or separately into the hopper and subsequently mixed in their passage through the apparatus. These substances falling upon the bottom of the upper pipe are seized by the upper conveyer and carried to the other end of the machine, being thoroughly turned over, mixed together, and incorporated in their progress. Exposed to heat from the furnace distillation commences, and such vapors as can be separated by the more moderate heat at the top pass off through the upper part of the pipe and escape at the opening H at the end opposite the inlet, to be afterward condensed. The mass of material falls through the connection between the upper pipe and the next and, traveling in the opposite direction, is exposed to a higher temperature, together with agitation, mixing, and stirring by the second conveyer, and gives off distillates in the same manner. Passing to the succeeding pipes, the same operations are repeated until in the last pipe or still there remains a combustible residuum composed of heavy hydrocarbon and carbonaceous material thoroughly incorporated and suitable for use in or as an artificial fuel and produced by the one continuous distilling operation.

The exit-pipe K for the product connects with the lowermost pipe or still and is preferably made tapering, as shown, to a certain point, after which it continues for a sufficient distance as a cylindrical passage. The diameter of the cylindrical portion should be the same as the diameter of the blocks, briquets, or other forms of the fuel. It is to be noted, however, that as that portion of the discharge-pipe beyond the tapering part is really a mold it can be of any desired cross-section other than circular, according to the shape which such briquets or forms are to have. By means of the pressure exerted by the conveyer in the lowermost still the residuum of distillation is forced out into the tapering part of the discharge-passage, and is hence put under compression, so that the material fills the non-tapering part of the discharge-passage and is there molded to its cross-section. As it emerges it is cut off in any suitable way into blocks, briquets, or forms of the desired thickness. It will of course be understood, however, that material discharged from the lower still may be collected as a mass and then subsequently pressed into shape by molding machinery of any desired construction. The discharge-passage is also a cooling device in order that the material may leave the apparatus properly cooled before exposure to the air. Such a cooling device is shown in the form of a water-bath L around the discharge-pipe. It is an important feature of the apparatus that it is designed to exclude cold air throughout. In open-air treatment it is difficult to obtain the proper degree of temperature to cause the hydrocarbon to penetrate the carbonaceous material. If the temperature be urged under the vessel, there is danger of heating the vessel to such an extent that vaporization of some of the hydrocarbons, which are desirable on account of their binding action, may take place, and there is also danger of charring, carbonizing, or coking the residue.

By carrying on the process in a closed apparatus the temperature can be regulated so as to avoid any coking of the pitchy substances, especially as the mass is continually kept in motion. The same apparatus can, however, be used in agglomerating a binding composition previously prepared with other materials, so as to produce an ultimate fuel, or if it be desired to increase the hardness of the binder the heat can be so increased and regulated by well-known means as to distil off lighter oils until the residuum is of the proper consistency. Indeed, by increasing the heat to the required degree the apparatus can be used to form a commercially-valuable coke from a mixture of hydrocarbons and suitable carbonaceous or carboniferous material.

Having thus fully described my invention, what I claim as new, and desire to secure by Letters Patent, is—

1. A distillation device comprising a passage with a lower portion open at both ends; said passage having a confined upper vapor-space, a feed-inlet, a discharge-outlet, and vapor-exits.

2. A distillation device comprising a passage with a lower portion open at both ends; said passage having a confined upper vapor-space, a feed-inlet, a discharge-outlet, and vapor-exits; and means for moving material through the passage.

3. A distillation device comprising a passage with a lower portion open at both ends; said passage having a confined upper vapor-space, a feed-inlet, a discharge-outlet, and vapor-exits; and a conveyer within the passage.

4. A distillation device comprising, in combination, a passage with a lower portion open at both ends; said passage having a confined upper vapor-space, a feed-inlet, a discharge-outlet, and vapor-exits; heating means; and means for cooling the residuum of distillation.

5. A distillation device comprising, in combination, a passage with a lower portion open at both ends; said passage having a confined upper vapor-space, a feed-inlet, a discharge-outlet, and vapor-exits; means for moving material through the passage; heating means; and means for cooling the residuum of distillation.

6. A distillation device comprising, in combination, a passage with a lower portion open at both ends; said passage having a confined upper vapor-space, a feed-inlet, a discharge-outlet, and vapor-exits; heating means; means for cooling the residuum of distillation; and means for molding the residuum of distillation into briquets for fuel purposes.

7. A distillation device comprising stills, each open at its lower end portions, and each comprising an upper vapor-space and having a vapor-exit, passages each connecting the lower open end portion of one still with that of another, a feed-inlet, a discharge-outlet, and heating means.

8. A distillation device comprising stills, each open at its lower end portions, and each comprising an upper vapor-space and having a vapor-exit, passages each connecting the lower open-end portion of one still with that of another, a feed-inlet, a discharge-outlet, means for moving material through the stills, and heating means.

9. A distillation device comprising stills, each open at its lower end portions, and each comprising an upper vapor-space and having a vapor-exit, passages each connecting the lower open-end portion of one still with that of another, a feed-inlet, a discharge-outlet, means inclosing the discharge-outlet for cooling the residuum of distillation, and heating means.

10. A distillation device comprising stills, each open at its lower end portions, and each comprising an upper vapor-space and having a vapor-exit, passages each connecting the lower open-end portion of one still with that of another, a feed-inlet, a discharge-outlet, means inclosing the discharge-outlet for cooling the residuum of distillation, means for moving material through the stills, and heating means.

11. A distillation device comprising connected stills, each with elongated vertical cross-section, an upper confined vapor-space, a lower portion open at both ends, and vapor-exits; and a conveyer in each still for moving material therethrough.

12. A distillation device comprising connected stills, each with elongated vertical cross-section, an upper confined vapor-space, a lower portion open at both ends, and vapor-exits; a conveyer in each still for moving material therethrough; and a tapering discharge-outlet.

13. A distillation device comprising connected stills, each with elongated vertical cross-section, an upper confined vapor-space, a lower portion open at both ends, and vapor-exits; a conveyer in each still for moving material therethrough; a tapering discharge-outlet, and a cooling bath inclosing the latter.

14. A distillation device comprising, in combination, connected stills, each with elongated vertical cross-section, an upper confined vapor-space, a lower portion open at both ends, and vapor-exits; conveyers in the stills having shafts geared together; a furnace; and a cooling device.

15. A distillation device comprising, in combination, connected stills, each with elongated vertical cross-section, an upper confined vapor-space, a lower portion open at both ends, and vapor-exits; conveyers in the stills having shafts geared together; a furnace; a cooling device; and means for forming the residuum into briquets for fuel purposes.

In testimony whereof I have affixed my signature, in presence of two witnesses, this 29th day of June, 1901.

JOHN T. DAVIS.

Witnesses:
F. M. BURT,
J. J. BURT.